United States Patent
Aksit et al.

(10) Patent No.: US 10,410,400 B1
(45) Date of Patent: Sep. 10, 2019

(54) DIGITAL IMAGE EDITING FOR IMAGES OF FOLDED OBJECTS

(71) Applicant: Adobe Inc., San Jose, CA (US)

(72) Inventors: Duygu Ceylan Aksit, San Jose, CA (US); Yangtuanfeng Wang, London (GB); Niloy Jyoti Mitra, Hemel Hempstead (GB); Mehmet Ersin Yumer, San Jose, CA (US); Jovan Popovic, Seattle, WA (US)

(73) Assignee: Adobe Inc., San Jose, CA (US)

( * ) Notice: Subject to any disclaimer, the term of this patent is extended or adjusted under 35 U.S.C. 154(b) by 22 days.

(21) Appl. No.: 15/915,872

(22) Filed: Mar. 8, 2018

(51) Int. Cl.
| | |
|---|---|
| *G06T 15/04* | (2011.01) |
| *G06T 7/33* | (2017.01) |
| *G06T 7/12* | (2017.01) |
| *G06T 11/00* | (2006.01) |
| *G06F 3/0484* | (2013.01) |
| *G06T 11/60* | (2006.01) |

(52) U.S. Cl.
CPC .......... *G06T 15/04* (2013.01); *G06F 3/04845* (2013.01); *G06T 7/12* (2017.01); *G06T 7/33* (2017.01); *G06T 11/001* (2013.01); *G06T 11/60* (2013.01); *G06T 2207/20084* (2013.01); *G06T 2210/16* (2013.01); *G06T 2215/12* (2013.01)

(58) Field of Classification Search
None
See application file for complete search history.

(56) References Cited

U.S. PATENT DOCUMENTS

| | | | | |
|---|---|---|---|---|
| 5,905,935 | A * | 5/1999 | Wakamatsu | B42C 1/12 270/32 |
| 9,654,666 | B1 * | 5/2017 | Snowball | H04N 1/393 |
| 9,684,935 | B2 * | 6/2017 | Matas | G06Q 50/01 |
| 2004/0177325 | A1 * | 9/2004 | Keane | G06F 17/212 715/255 |
| 2007/0113437 | A1 * | 5/2007 | Biser | G09F 5/00 40/492 |
| 2009/0267909 | A1 * | 10/2009 | Chen | G06F 3/0483 345/173 |
| 2014/0078135 | A1 * | 3/2014 | Ka Yan | G06F 3/04883 345/419 |

(Continued)

OTHER PUBLICATIONS

Barron, Jonathan T., et al., "Shape, Illumination, and Reflectance from Shading", vol. 37, No. 8, Aug. 1, 2015, pp. 1670-1687.

(Continued)

*Primary Examiner* — Frank S Chen
(74) *Attorney, Agent, or Firm* — Brake Hughes Bellermann LLP (57) ABSTRACT

Systems and techniques provide a user interface within an application to enable users to designate a folded object image of a folded object, as well as a superimposed image of a superimposed object to be added to the folded object image. Within the user interface, the user may simply place the superimposed image over the folded object image to obtain the desired modified image. If the user places the superimposed image over one or more folds of the folded object image, portions of the superimposed image will be removed to create the illusion in the modified image that the removed portions are obscured by one or more folds.

20 Claims, 7 Drawing Sheets

(56) References Cited

U.S. PATENT DOCUMENTS

2014/0111641 A1* 4/2014 Counts, Jr. .............. G06F 3/005
 348/143
2016/0132074 A1* 5/2016 Kim ...................... G06F 1/1652
 715/769

OTHER PUBLICATIONS

Xie, Saining, et al., "Holistically-nested edge detection", In Proceedings of the IEEE international conference on computer vision, 2015, pp. 1395-1403.

* cited by examiner

DIGITAL IMAGE EDITING FOR IMAGES OF FOLDED OBJECTS

TECHNICAL FIELD

This description relates to digital image editing.

BACKGROUND

Digital image editing refers generally to the use of computer software and associated hardware to access a digital image file and perform modifications on the image of the digital image file. In many cases, digital image editing techniques are designed to incorporate a modification within an original image to produce a modified image. In particular, the resulting modified image may be visually indistinguishable from a (real or hypothetical) version of the original image that actually includes the modification.

For example, if an image of a group of persons (such as a family, team, or other group) is captured in which a member of the group is missing, digital image editing could be performed to modify the digital image to include an otherwise separate digital image that includes the missing member. The resulting modified image may then appear to have been taken of the entire group.

In many cases, it may be difficult or impossible for an observer to visually distinguish whether or how a modified digital image has been modified, so that the modified image appears very realistic. In other cases, however, the digital image editing software and associated hardware may be incapable of rendering the modified digital image in a realistic fashion.

For example, it may occur that a folded object is captured within a digital image, such as when a picture is taken of a folded cloth, garment, or paper. Then, a user may wish to perform digital image editing that includes superimposing a second image onto the captured image of the folded object. However, if the second image is superimposed over the folded portion of the folded object within the original image, the resulting modified image may appear unrealistic.

SUMMARY

According to one general aspect, a computer program product is tangibly embodied on a non-transitory computer-readable storage medium and includes instructions. When executed by at least one computing device, the instructions are configured to cause the at least one computing device to receive a folded object image including a folded object, the folded object image rendered within a graphical user interface and including at least one fold, the at least one fold obscuring a portion of the folded object and defining at least one seam edge. The instructions, when executed, are further configured to receive a superimposed image, identify a portion of the superimposed image corresponding to the portion of the folded object, and generate a modified image in which the portion of the superimposed image is removed, and a remaining portion of the superimposed image is superimposed on the folded object image and traverses the at least one seam edge.

According to another general aspect, a computer-implemented method includes receiving a folded object image including a folded object, the folded object image rendered within a graphical user interface and including at least one fold, the at least one fold obscuring a portion of the folded object and defining at least one seam edge, and performing image decomposition on a first unfolded image region of the folded object image and a second unfolded image region of the folded object image, the first unfolded image region and the second unfolded image region being defined with respect to the at least one seam edge. The method further includes receiving a superimposed image, and generating, based on the image decomposition, a modified image in which a portion of the superimposed image that corresponds to the portion of the folded object is removed, and a remaining portion of the superimposed image is superimposed on the folded object image and traverses the at least one seam edge.

According to another general aspect, a computer program product is tangibly embodied on a non-transitory computer-readable storage medium and comprising instructions. When executed by at least one computing device, the instructions are configured to cause the at least one computing device to receive a folded object image including a folded object, the folded object image rendered within a graphical user interface, detect at least one seam edge within the folded object image and corresponding to at least one fold of the folded object, and separate the folded object image using the at least one seam edge, to obtain a first unfolded image region and a second unfolded image region. When executed, the instructions are further configured to generate a first texture map for the first unfolded image region and a second texture map for the second unfolded image region, the first texture map and the second texture map representing two-dimensional mappings of the first unfolded image region and the second unfolded image region, respectively, receive a superimposed image of a superimposed object, and generate a modified image combining the folded object image and a portion of the superimposed image traversing the at least one seam edge, using the two-dimensional mappings.

The details of one or more implementations are set forth in the accompanying drawings and the description below. Other features will be apparent from the description and drawings, and from the claims.

DETAILED DESCRIPTION

This document describes systems and techniques that provide for digital image editing of folded objects. Such systems and techniques overcome technical challenges of previous systems and techniques, and improve the process (es) to perform related automated processing. For example, from within a digital image editing software application, a folded object image of a folded object may be modified by adding a superimposed image of a superimposed object, to obtain a modified image in which the superimposed image is overlaid across one or more folds of the folded object image in a highly realistic manner, e.g., giving an appearance that the superimposed object was actually overlaid on the folded object at a time that the folded object image was created. The described digital image editing techniques utilize a more efficient, faster, more accurate and more complete algorithm(s) than other algorithms that attempt to edit images of folded objects. Moreover, the digital image editing techniques provide for the new computer functionality of, e.g., editing digital images of folded objects in a fast, highly configurable manner, while requiring minimal technical expertise on a part of a user of the digital image editing software application.

The systems and techniques provide a user interface within the application to enable users to designate a folded object image of a folded object, as well as a superimposed image of a superimposed object to be added to the folded object image. Within the user interface, the user may simply place the superimposed image over the folded object image to obtain the desired modified image. If the user places the superimposed image over one or more folds of the folded object image, portions of the superimposed image will be removed to create the illusion in the modified image that the removed portions are obscured by one or more folds. In some implementations, the superimposed image may be moved within the user interface to different portions of the folded object image, and across different fold(s) thereof, and different portions of the superimposed image will be removed, as needed, in order to result in a modified image that appears realistic and maintains an illusion that the superimposed image was actually included on the folded object at a time of creation of the folded object image.

As described in detail below, example techniques include the use of various types of machine learning and associated algorithms and models, in which a synthetic dataset is generated for the type of digital images to be edited, including synthetic images of different types of folded objects. The synthetic dataset is then used as a training dataset to train a plurality of related models and algorithms.

For example, a model such as a convolutional neural network may be trained to recognize a seam edge caused by a fold within an image of a three-dimensional folded object, so that continuous, unfolded portions of the folded object may be defined with respect to the detected seam edge(s). An algorithm for a normal map estimation may be trained and implemented to create normal maps for each of the continuous, unfolded portions, in which surface details of each three-dimensional, unfolded portion are expressed in a two-dimensional representation in which a surface normal is defined with respect to each pixel of the corresponding, three-dimensional, unfolded portion. Further, an algorithm may be defined for using the normal map(s) to generate a texture map in which each three-dimensional, unfolded portion is mapped (parameterized) to a two-dimensional shape(s).

The above algorithms may be used for each continuous, unfolded portion defined with respect to each detected fold of the folded object. A combined texture map may thus be created, e.g., in which the texture maps of all of the continuous, unfolded portions are combined.

Once the combined texture map is obtained, a direct mapping exists between each pixel of the combined texture map and a corresponding pixel of the original, folded object image. Consequently, when the superimposed image is overlaid on the combined texture map, a mapped subset of pixels of the superimposed image will map to corresponding pixels of the folded object image, while an unmapped subset of the superimposed image pixels will not be mapped to the folded object image. That is, the unmapped subset of the superimposed image pixels represent portions of the superimposed object that do not appear within the modified image, because they represent portions of the superimposed object obscured by the fold(s) of the folded object.

In this way, or using additional or alternative techniques, it is possible to create and edit highly realistic images of folded objects. Such editing may be performed quickly and easily, and at large scales (e.g., many images may be edited together).

Additionally, the systems and techniques described herein advantageously improve existing technology areas. For example, as described, computer-based digital image editing is improved. Further, the systems and techniques may be used for a more automated and more efficient and faster approach to generating desired digital images.

Figure 1:
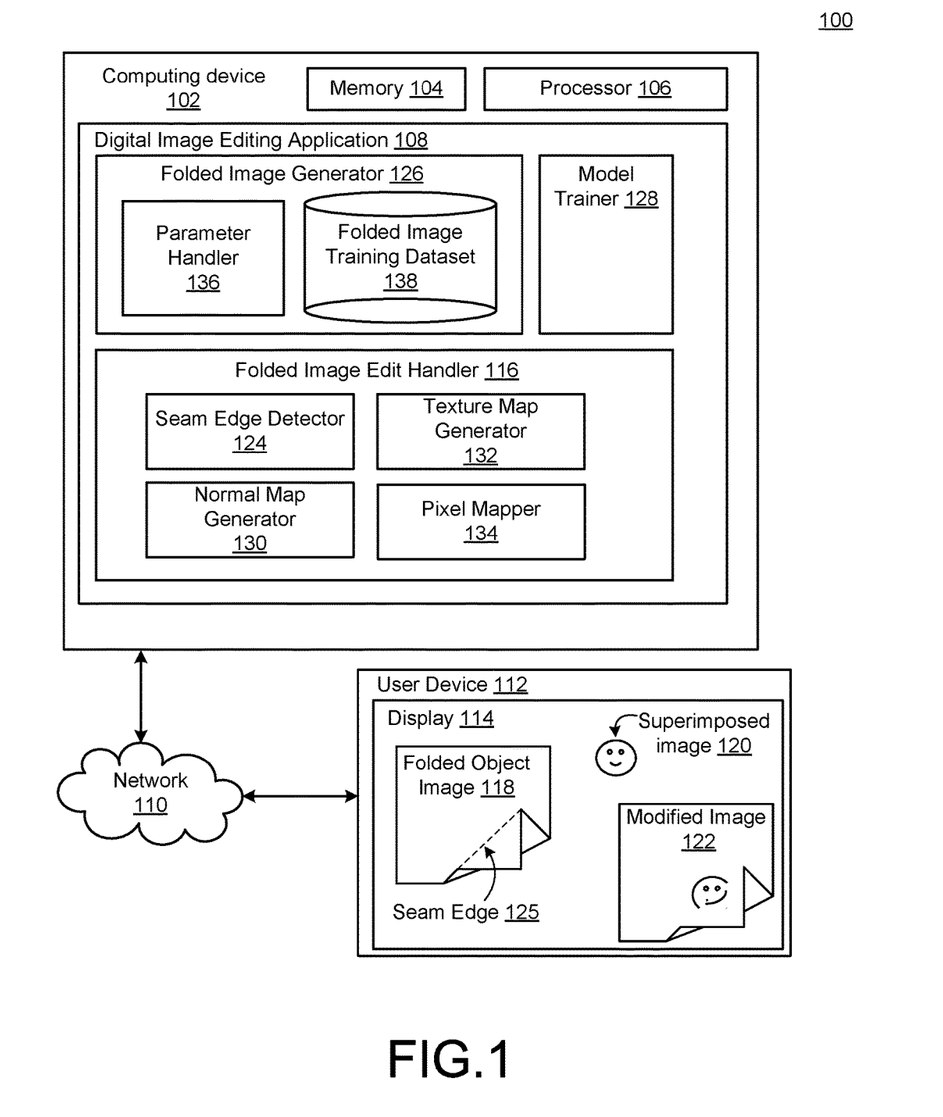
FIG. 1 is a block diagram of a system for digital image editing for images of folded objects.

FIG. 1 is a block diagram of a system 100 for digital image editing of images of folded objects. The system 100 includes a computing device 102 having at least one memory 104, at least one processor 106 and at least one application 108. The computing device 102 may communicate with one or more other computing devices over a network 110. The computing device 102 may be implemented as a server, a desktop computer, a laptop computer, a mobile device such as a tablet device or mobile phone device, as well as other types of computing devices. Although a single computing device 102 is illustrated, the computing device 102 may be representative of multiple computing devices in communication with one another, such as multiple servers in communication with one another being utilized to perform various functions over a network. In many of the following examples, the computing device 102 is described as, or may be understood to represent, a server.

The at least one processor 106 may represent two or more processors on the computing device 102 executing in parallel, and utilizing corresponding instructions stored using the at least one memory 104. The at least one memory 104 represents at least one non-transitory computer-readable storage medium. Thus, similarly, the at least one memory 104 may represent one or more different types of memory utilized by the computing device 102. In addition to storing instructions, which allow the at least one processor 106 to implement the application 108 and its various components, the at least one memory 104 may be used to store data.

The network 110 may be implemented as the Internet, but may assume other, different configurations. For example, the network 110 may include a wide area network (WAN), a local area network (LAN), a wireless network, an intranet, combinations of these networks, and other networks. Of course, although the network 110 is illustrated as a single network, the network 110 may be implemented as including multiple different networks.

The application 108 may be accessed directly by a user of the computing device 102, at the computing device 102. In other implementations, the application 108 may be running on the computing device 102 as a component of a cloud network where a user accesses the application 108 from another computing device (e.g., user device 112) over a network, such as the network 110. In one implementation, the application 108 may be a digital image editing application, or another type of application that accesses digital image editing functionality. In other implementations, the application 108 may be a stand-alone application that is designed to work with a digital image editing application (e.g., running on the user device 112). In still other alternatives, the application 108 may be an application that runs, at least partially, in another application, such as a browser application. Of course, the application 108 may be a combination of any of the above examples, as well.

In the example of FIG. 1, the user device 112 is illustrated as including a display 114. The display 114 may represent a graphical user interface of the application 108, and/or a browser application used to access the application 108, as just referenced.

In the example of FIG. 1, the application 108 includes, or has access to, a folded image edit handler 116. As described herein, the folded image edit handler 116 is configured to enable realistic, accurate editing of a folded object image 118, including adding a superimposed image 120 to thereby obtain a modified image 122.

In this regard, a "folded object image" refers to a digital image file illustrating a folded object. A "folded object" should be understood to represent virtually any object having a fold, where the term "fold" is used to refer to any bend, crease, curvature, or other shape of the imaged object that obscures at least a portion of the folded object that might otherwise be visible within the folded object image, but for the presence of the fold. Put another way, a fold refers to any discontinuity within an image at which two or more otherwise disparate points on the folded object are brought together, or appear to be brought together within the folded object image (e.g., due to an angle at which the image was obtained), and in a manner that obscures at least a portion of the folded object that exists between the disparate points.

A number of non-limiting examples of such folds are provided herein, or would be apparent. For example, any cloth, garment, or paper may be folded, and the simplified example of FIG. 1 illustrates such a cloth or paper object 118 having a lower-right corner that is bent inward and obscures part of a lower-right portion of the cloth/paper.

Thus, a fold may be physically, directly imparted to a folded object by a user, such as in the folded paper example just referenced. In such examples, the material of which the folded object is composed is pliable, elastic, or otherwise bendable or flexible. In these and other examples, a fold may also represent an inherent or existing feature of the folded object, which may occur even if the folded object does not possess a particular degree of flexibility. For example, a wooden or metal object may be constructed with a corner or other junction that would be considered to be a fold within an image of such an object, when causing a portion of such an object to be obscured within the image. Similarly, an image of a face may be considered to have a fold in similar scenarios, such as when an image of a face is taken from an angle at which the nose obscures a portion of the cheek.

Figure 2:
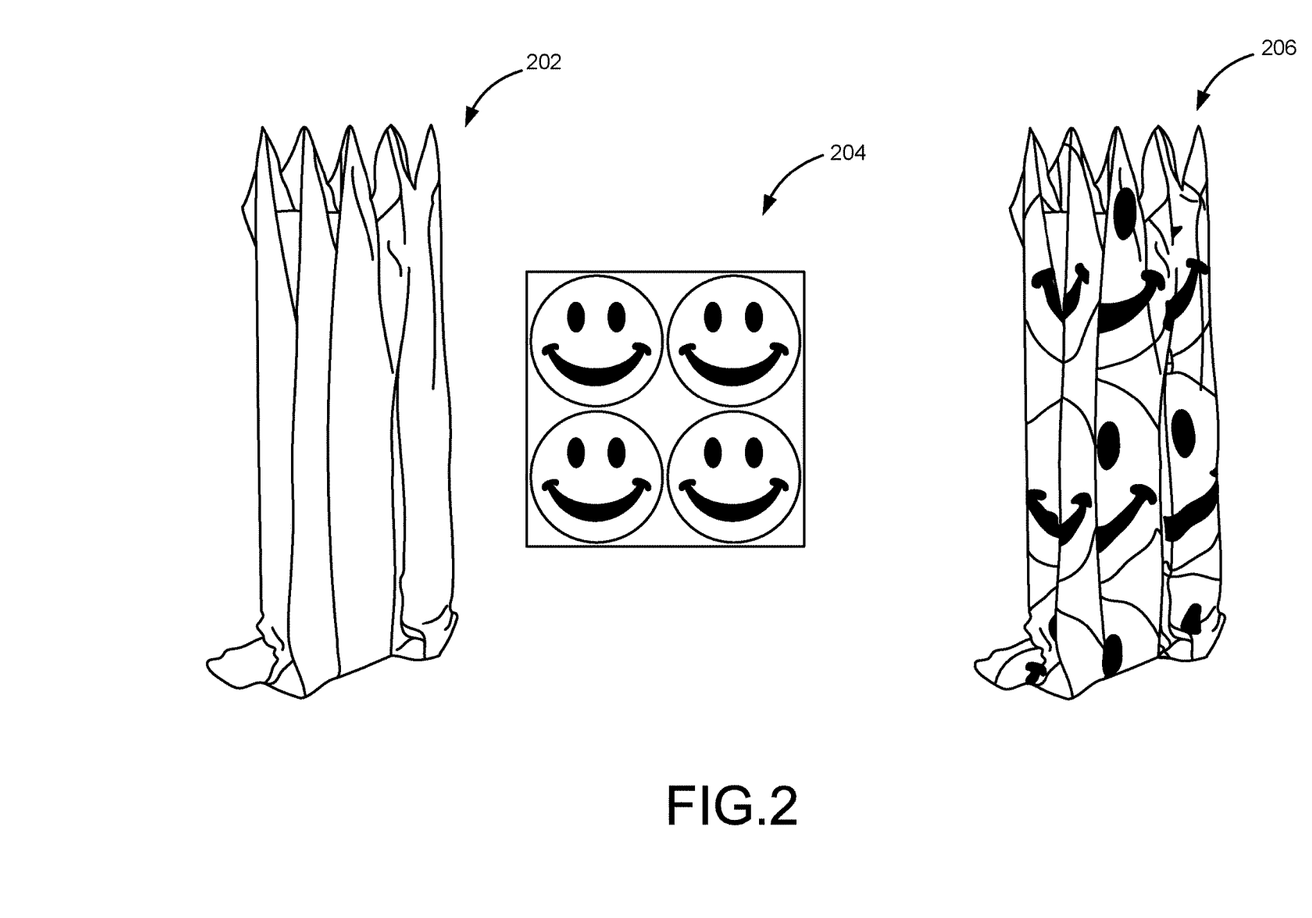
FIG. 2 illustrates a first example of image editing performed using the system of FIG. 1.

In further examples, a fold may occur situationally, e.g., as a result of a particular context of the object being folded, as a result of physical forces acting on the object (such as gravity). For example, as illustrated in FIG. 2, a curtain hanging from a rod will naturally have a number of folds. Similarly, a shirt or other article of clothing will have folds that are created as a wearer moves, and paper items may exhibit folds over time, as a function(s) of age and use.

In FIG. 1, the folded object of the folded object image 118 may represent a physical item, of which an image is taken with an appropriate camera (or any image-detection technique). In other examples, the folded object image 118 may be generated using the application 108, or other image-generation software.

Similar comments apply to the superimposed image 120. That is, the superimposed image 120 may represent any image of a physical item, or any image generated by the application 108, or other software. As is apparent from the present description, the superimposed image 120 is referred to as "superimposed" because the various examples describe and illustrate a superimposing process that occurs over one or more folds of a folded object image. Thus, although the superimposed image 120 may generally represent virtually any suitable image, the provided examples describe scenarios in which a user might desire to realistically represent an inclusion of the superimposed image 120 on the original folded object of the folded object image 118. For example, as described, a user might wish to illustrate a logo on a piece of clothing, or a tattoo on a person's skin, or any graphic, artwork, or design that might be expected to occur or be included on a folded object.

In the example of FIG. 1, if the folded object of the folded object image 118 were unfolded, it might be straightforward to superimpose the "happy face" of the superimposed image 120 thereon, e.g., by pasting the superimposed image 120 onto the folded object image 118, using conventional image editing software. When folded, however, it is apparent that simple pasting of the superimposed image 120 over one or more folds would be likely to result in an unrealistic modified image, because none of the superimposed image 120 would be obscured by the relevant fold(s), and would simply lay across the fold(s).

In FIG. 1, however, the folded image edit handler 116 includes a seam edge detector 124 that is configured to analyze the folded object image 118 and detect one or more seam edges 125 included therein. In various examples, the fold detector 124 may utilize training data generated by a folded image generator 126 to train, e.g., a convolutional neural network (CNN) using a model trainer 128, as described in detail, below.

More specifically, the fold detector 124 may be configured to identify at least one seam edge 125 that is defined by, or caused by, one or more corresponding folds. That is, as described and illustrated below, e.g., with respect to FIG. 5, a seam edge represents points (e.g., defining a line) of discontinuity at which otherwise disparate points of the folded object are brought together, and which correspond to obscured portions of the folded object.

In various scenarios, a seam edge may be the same as, or include, a fold, so that it may be appropriate to use the terms interchangeably to some degree. In other scenarios, one or more folds may occur in one portion of the folded object, and may cause one or more seam edges to occur in another portion of the folded object, and/or in the folded object image 118.

Once the seam edge detector 124 detects the seam edge 125, the seam edge detector 124 may divide the folded object image into unfolded image regions that are defined by the seam edge 125. Examples of this division process are provided below in more detail, e.g., with respect to FIG. 4. In general, however, it will be appreciated that the resulting unfolded image regions represent continuous, unfolded regions of the folded object image 118.

Once divided in this manner, the folded image edit handler 116 may proceed to perform specific types of image decomposition on each divided portion of the folded object image, e.g., on each unfolded image region. In this regard, the term image decomposition generally refers to one or more processes for analyzing a three dimensional nature of the folded object, as well as conditions that may have existed when the folded object image was created, and notwithstanding a two dimensional nature of the folded object image 118 itself.

In other words, for example, it is typical for information loss to occur when capturing a three-dimensional object in a two-dimensional space. Although it is possible in theory to capture some of the lost information from external sources (e.g., images taken from other angle(s)), such supplemental information is not typically available when editing an image, and is not required by the system 100 of FIG. 1. Instead, various methods have been developed for analyzing the two-dimensional representation (image), and inferring a most-likely occurrence of the lost information.

For example, when taking an image of a three-dimensional object, the three-dimensional object may exist in the context of certain conditions, and may have various three-dimensional characteristics. Such conditions may include a degree and angle of lighting and associated shading, as well as relative size, distance, or angle from a camera being used, or with respect to other objects in the captured image. Three-dimensional characteristics may include a texture of the object, or, as described herein, a fold of the object.

Moreover, some two-dimensional aspects of a folded object may be difficult to distinguish from a three-dimensional aspect, when observed in the folded object image. For example, as described in detail below, it is a feature of the fold detector 124 to distinguish a three-dimensional aspect such as a seam edge from a two-dimensional aspect, such as a stripe or line that happens to be present within the folded object.

A number of examples of image decomposition techniques, and resulting decomposed images, are provided below. For example, a normal map generator 130 may be configured to construct a normal map in which a surface normal (vector) is generated for each image pixel of an image, or image portion. In other words, for example, by generating a surface normal that is perpendicular to a point of an object corresponding to a pixel of an image of that object, it is possible to capture and represent three-dimensional surface detail in a two-dimensional space.

Also in the example of FIG. 1, a texture map generator 132 may be configured to generate a texture map in which a two-dimensional image of a three-dimensional object is mapped to a two-dimensional space. For example, such an image may be mapped to the surface of one or more two-dimensional shapes, e.g., polygon(s). Often, the xy coordinates of the original two-dimensional image are considered to be mapped to a "uv" coordinate system of the texture map, where the axes are named/referenced using the variables u, v in order to distinguish from the more commonly-used axes names of x, y.

In other words, such a texture map may be thought of as projecting a three-dimensional surface onto a two-dimensional space (often referred to as a "parameterization"), so that the three-dimensional object is effectively flattened. Of course, perfectly executing such a projection is not always possible, and it may occur that a distortion occurs in the resulting texture map that represents such imperfections of the projection process.

In the example of FIG. 1, the types of image decomposition referenced with respect to the normal map generator 130 and the texture map generator 132, as well as other types of image decomposition, may be performed with respect to each of the unfolded image regions provided by the seam edge detector 124. As a result, a corresponding plurality of texture maps may be obtained (e.g., a texture map for each unfolded image region). Then, a pixel mapper 134 may be configured to combine the plurality of texture maps at edges thereof defined by the detected seam edge(s), and obtain a combined texture map with pixels that map directly to pixels of the folded object image 118.

As a result, for example, when a user of the system 100 moves the superimposed image 120 over the seam edge 125 of the folded object image 118, the pixel mapper 134 may simultaneously place the superimposed image 120 over the previously-constructed, combined texture map. Accordingly, a pixel of the superimposed image 120 will be laid over a pixel of the combined texture map, which is itself mapped to a pixel of the folded object image 118.

As this mapping is executed for each pixel of the superimposed image 120, the modified image 122 is constructed, in which some of the pixels of the superimposed image 120 are omitted. That is, such omitted pixels conceptually represent portions of the superimposed image 120 that would be obscured within an obscured, folded portion of the original folded object, if the superimposed image 120 had been present on the folded object when the folded object was folded and/or when the folded object image 118 was created. As a result, in the modified image 122, the superimposed image 120 is only partially visible, and outer portions thereof have the appearance of being drawn together as part of the original folding process that caused the seam edge 125 to be present.

With reference to FIG. 2, a more detailed example is provided, in which an image 202 of a hanging curtain includes a number of folds. An image 204 illustrates an example of a design to be superimposed on the image 202. Consequently, a modified image 206 illustrates a result of operations of the folded image edit handler 116, in which the image 204 appears to have existed on the hanging curtain of the image 202 at a time of creation of the image 202.

In the example of FIG. 1, as referenced above, the model trainer 128 may be used to train a CNN of the seam edge detector 124, and such training data may be obtained from a folded image generator 126. More specifically, as shown, the folded image generator 126 may be configured to receive various parameters via a parameter handler 136, and output a resulting, desired folded image training dataset 138.

More specifically, such parameters may be used to generate a "ground truth" of folded object images and superimposed images, as well as resulting modified images. That is, relevant information is included that would not normally be expected, needed, or available for operations of the folded image edit handler 116, but that are used for training purposes by the model trainer 128.

For example, such ground truth data may include dimensions or other aspects or characteristics of a material, or type of material, that might be present in the folded object image 118 (such as the material (e.g., cloth) of the curtain of the image 202 of FIG. 2). The ground truth data may include, or represent, the folded object image both with and without a superimposed image included thereon at a time of creation of the folded object image.

In other words, a folded object image may include an image of a folded object having a design included thereon, and folded to provide the type of modified image 122 desired to be produced by the folded image edit handler 116. A folded object image also may be included that does not have the design, where the design image is superimposed over the folded object image, and a resulting modified image may then be compared to the folded object image of the folded object that included the same design image.

Put another way, the ground truth data of the folded image training dataset 138 provides a correct solution(s) to the type of problem desired to be solved, so that efforts of the model trainer 128 in producing the same or similar results may be judged accordingly. Once the model trainer 128 succeeds in providing results that sufficiently match the known, correct solutions, the resulting, trained model(s) is assumed to be configured to input images in the future (such as the images 118, 120, or 202, 204), and successfully provide resulting modified images (e.g., 122, or 206).

As described herein, the parameters provided to the parameter handler 136 may vary, e.g., based on the types of images expected to be edited. For example, different parameters may be provided for images expected to be of paper, as compared to images expected to be of cloth. The parameters may reflect expected sizes of the objects, potential lighting conditions, a size of the dataset to be generated, and other relevant parameters.

In FIG. 1, the folded image generator 126 may synthetically generate the dataset 138, using the provided parameters. Of course, in additional or alternative examples, actual before/after images of folded objects with included images may also be used for training purposes. Nonetheless, it will be appreciated that the ability of the generator 126 to synthetically generate the dataset 138, without having to rely on, create, or identify real-world folded object images, means that a very large and comprehensive training dataset may be quickly and easily obtained, for any of the various types of images and associated parameters that may be desired by a user of the application 108. As a result, the model trainer 128 may be provided with sufficient training data to result in reliable, accurate, and efficient operations of the folded image edit handler 116, as described below.

More specifically, in the following description, the model trainer 128 is configured to provide training for one or more neural networks, and related models or algorithms, using the dataset 138. In the example of FIG. 1, several examples of such neural networks are provided, each of which is configured to provide specific functionalities with respect to operations of the folded image edit handler 116. Specifically, the model trainer 128 may be utilized to train a model for the seam edge detector 124, the normal map generator 130, and the texture map generator 132, as well as any other type(s) of image decomposition that may be desired or required.

In general, neural networks provide computational models used in machine-learning that are made up of nodes organized in layers. The nodes may also be referred to as artificial neurons, or just neurons, and perform a function on provided input to produce some output value. Such neural networks generally require a training period to learn parameters (e.g., weights) used to map an input to a specific output. As referenced above, the dataset 138 provides training examples that include a "ground truth" that is used by the model trainer 128 to train the various models of the modules 124, 130, 132.

The model trainer 128 may be configured to execute training, using the training examples of the dataset 138, including executing a series of iterative rounds of training, in which optimal weight values for one or more mapping functions used to map input values to output values are determined. In determining the optimal weights, the model trainer 128 essentially makes predictions based on available data, and then measures the error in the predictions, using the ground truth available in conjunction with the dataset 138. The function used to measure such error levels is often referred to as a loss function, which is generally designed to sum over the relevant training examples, and add to the calculated loss if a prediction was incorrect, or reduce/minimize the calculated loss if the prediction was correct. In this way, the various models may be conceptually understood to be trained to learn from mistakes made during the various iterations of predictions, so that the resulting, trained models, as referenced, will be fast, efficient, and accurate when deployed in the context of the folded image edit handler 116.

In the example of FIG. 1, the model trainer 128 trains the convolutional neural network (CNN) of the seam edge detector 124, which represents a particular type of neural network that is especially configured for processing images. That is, because such convolutional neural networks make an explicit assumption that input features are images, properties may be encoded into the CNN 136 that caused the CNN 136 to be more efficient than a standard neural network, while reducing a number of parameters required by the CNN 136 relative to a normal neural network.

In more detail, the parameters of the CNN 136 may include one or more learnable filters, where each filter has spatial dimensions of width and height, while extending through a full depth of an input volume. For example, if an input to the CNN 136 includes an image, then a filter applied to the image may have an example size of 5×5×3, representing 5 pixels worth of width, 5 pixels worth of height, and 3 depth dimensions corresponding to potentially included color channels. To apply the CNN 136, each of the one or more filters is passed (in other words, convolved) across a width and height of filtered pixels of the input image. As the filter is convolved across the width/height and volume of the input image, a dot product or other appropriate calculation may be made between entries of the filter and each input position.

As referenced above with respect to neural networks, the parameters of the one or more filters will learn and be adjusted over time, so as to be activated in response to the desired type of visual feature (e.g., the seam edge 125, and/or some other image aspect for which the CNN is being trained). Thus, once the CNN has been successfully trained, the result will be, e.g., a set of parameterized filters in a corresponding plurality of layers, each of which produces a separate 2D feature map, which may then be compiled along the depth dimension to produce a total output feature map volume.

Of course, the example of the model trainer 128 should be understood to be non-limiting, in that various or alternative types of neural networks may be utilized. For example, multiple convolutional neural networks may be utilized, each trained to identify different image aspects of one or more input images. Additional or alternative aspects of the model trainer 128 are provided as examples below, or would be apparent to one of skill in the art.

Once training has been completed, the folded image edit handler 116 may be deployed to receive new folded object images, such as the image 118, and various superimposed images, such as the image 120. Accordingly, users of the system 100 may be provided with an ability to generate realistic images, in a fast and efficient manner, and without requiring particular technical expertise of the users.

Figure 3:
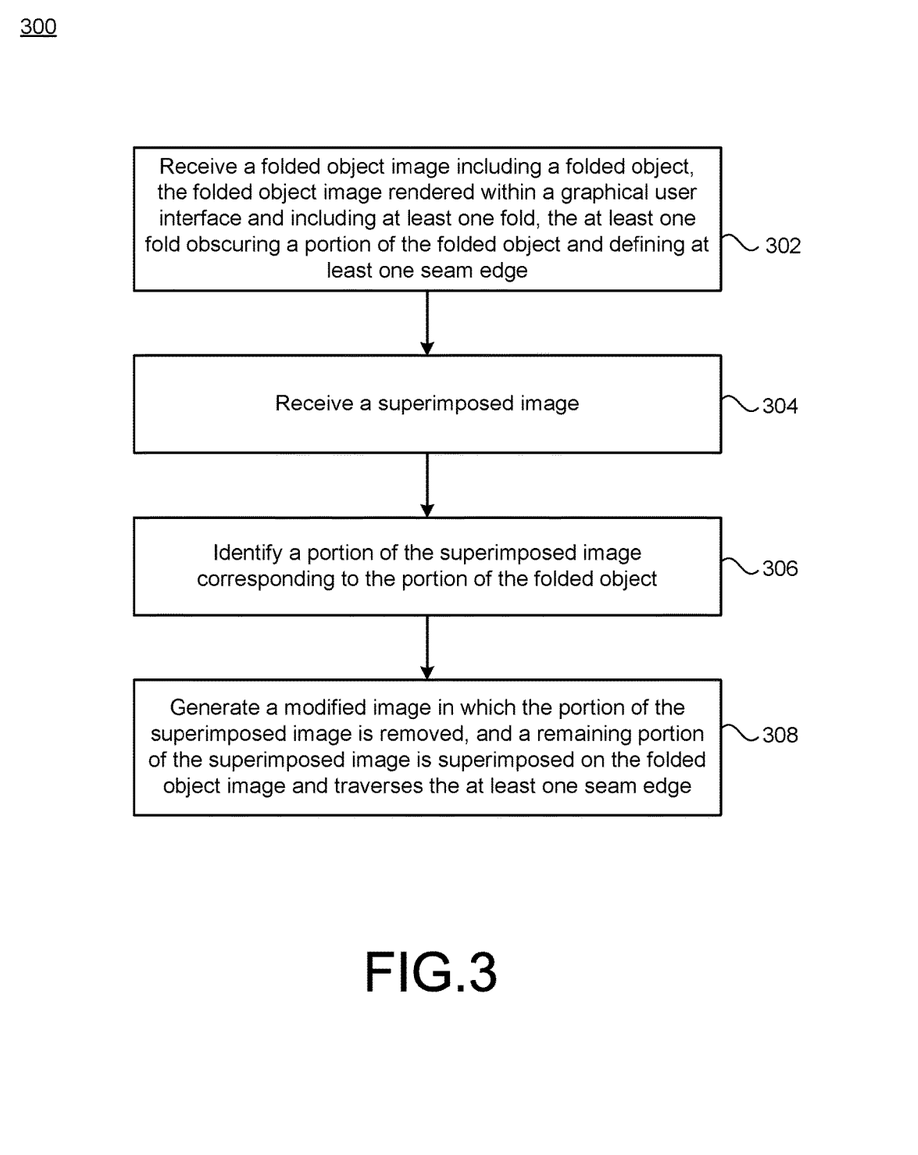
FIG. 3 is a flowchart illustrating example operations of the system of FIG. 1.

FIG. 3 is a flowchart 300 illustrating example operations of the system 100 of FIG. 1. In the example of FIG. 3, operations 302-308 are illustrated as separate, sequential operations. However, it will be appreciated that, in various implementations, additional or alternative operations or sub-operations may be included, and/or one or more operations or sub-operations may be omitted. Further, it may occur that any two or more of the operations or sub-operations may be executed in a partially or completely overlapping or parallel manner, or in a nested, iterative, looped, or branched fashion.

In the example of FIG. 3, a folded object image including a folded object is received, the folded object image rendered within a graphical user interface and including at least one fold, the at least one fold obscuring a portion of the folded object and defining at least one seam edge (302). For example, in FIG. 1, the seam edge detector 124 may be configured to receive the folded object image 118, and detect the seam edge 125, as described and illustrated above with respect to FIG. 1. Similar comments would apply with respect to the folded object image 202 of FIG. 2.

A superimposed image may be received (304). The superimposed image may have a position within the graphical user interface with respect to, e.g., positioned over, the at least one seam edge. For example, the folded image edit handler 116 may be configured to receive the superimposed image 120 in FIG. 1, or the superimposed image 204 in FIG. 2. As may be understood from the included descriptions and illustrations, the various superimposed images may be defined within the graphical user interface with respect to the various folded object images, using a variety of techniques.

For example, in FIG. 1, the superimposed image 120 may be movable within the display 114 relative to the folded object image 118 and the seam edge 125. For example, a user may perform a drag-and-drop operation with respect to the superimposed image 120, in order to position the superimposed image 120 over the folded object image 118, and at a desired position with respect to the seam edge 125. In other examples, such as the example of FIG. 2, the user may simply designate the folded object image 202 and a design of the superimposed image 204, without necessarily dragging and dropping the design of the superimposed image 204 over the folded object 202 within a graphical user interface. Thus, in an example such as those corresponding to the example of FIG. 2, the folded image edit handler 116 may be configured to replicate a design of the superimposed image 204 over an entirety of the folded object image 202, to thereby obtain the modified image 206, as illustrated.

A portion of the superimposed image corresponding to the portion of the folded object may be identified (306). For example, as referenced above and described and illustrated in detail below, the normal map generator 130 and the texture map generator 132 may be configured to generate a combined texture map that provides a 2D parameterization of portions of the folded object image 118 defined with respect to the detected seam edge 125. As described with respect to the pixel mapper 134, the resulting, combined texture map may then be mapped on a pixel-for-pixel basis to the original folded object image 118. Consequently, pixels of the superimposed image 120 that do not map to the folded object image 118 correspond to an obscured portion of the superimposed image 120 that is removed from the superimposed image 120 within the context of the modified image 122, as illustrated.

Thus, a modified image in which the portion of the superimposed image is removed may be generated, with the remaining portion of the superimposed image superimposed on the folded object image and traversing the at least one seam edge (308). That is, as just referenced with respect to the example of FIG. 1, portions of the superimposed image 120 that map, via the pixel mapper 134, to the folded object image 118 may be rendered at a position traversing the seam edge 125, resulting in the modified image 122.

Figure 4:
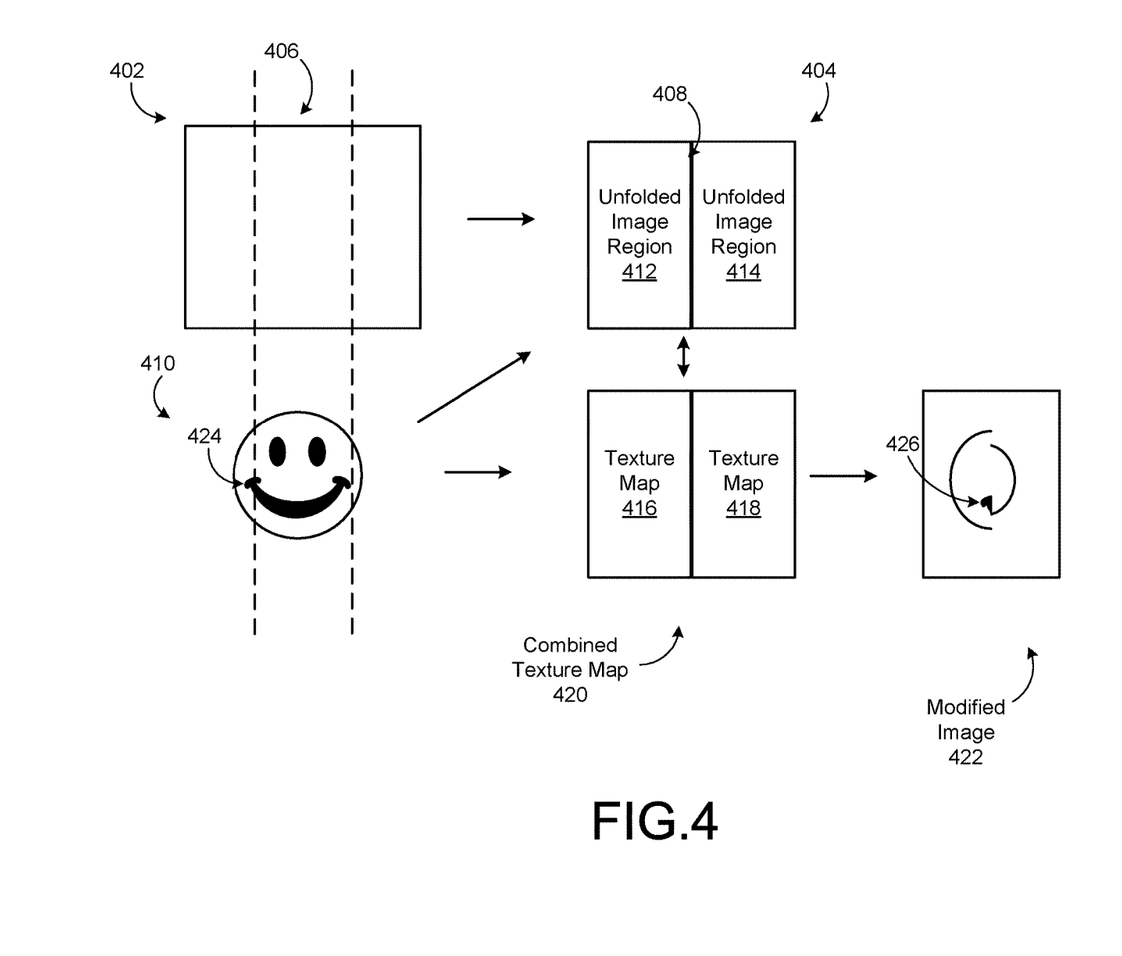
FIG. 4 illustrates a second example of image editing performed using the system of FIG. 1.

FIG. 4 illustrates a simplified example according to the operations 302-308 of FIG. 3, using the system 100 of FIG. 1. In the example of FIG. 4, a folded object 402 is folded to define and create a folded object image 404. For example, a camera or other digital imaging device may be used to capture the folded object image 404 of the folded object 402. Of course, in practice, it may occur that the folded object image 404 is generated using appropriate imaging software, but FIG. 4 is intended to illustrate the physical scenario that is desired to be re-created using the folded image edit handler 116, as described herein. Thus, in FIG. 4, the folded object 402 is folded by bringing together edges within the folded object 402 defined by the illustrated pair of dashed lines, and creating an obscured portion 406, that thus defines a seam edge 408 within the folded object image 404 (e.g., corresponding to the seam edge 125 of the folded object image 118 in the example of FIG. 1).

FIG. 4 further illustrates that a superimposed image 410 is aligned over the seam edge 408 and corresponding obscured region 406, and thus also contains an obscured portion within the dashed lines defining the obscured portion 406 of the folded object 402. In other words, defining the obscured portions 406 of the folded object 402 and the superimposed image 410 references the desired effect of the digital image editing, i.e., to realistically illustrate an image that would have occurred if the superimposed image 410 had been present on the folded object 402 at a time that the folded object 402 was folded, and when the folded object image 404 was generated.

As illustrated in FIG. 4, the seam edge 408 of the folded object image 404 may be used to define an unfolded image region 412, as well as an unfolded image region 414. For example, the seam edge detector 124 of FIG. 1 may execute a trained CNN to detect the seam edge 408, and thereafter divide the folded object image 404 into the unfolded image region 412 and the unfolded image region 414, based on the detected seam edge 408.

Subsequently, rather than performing image decomposition on the folded object image 404 as a whole, the normal map generator 130 and texture map generator 132 of FIG. 1 may proceed to perform image decomposition individually on each of the unfolded image regions 412, 414, to thereby obtain a texture map 416 that corresponds to the unfolded image region 412, and a texture map 418 that corresponds to the unfolded image region 414. As illustrated, the texture maps 416, 418 may then be combined to obtain a combined texture map 420.

As a result, the combined texture map 420 includes a pixel-for-pixel mapping to the folded object image 404. Consequently, if editing of the superimposed image 410 is performed with respect to the combined texture map 420, results of such editing may be easily mapped to the folded object image 404, to obtain a modified image 422.

For example, as illustrated, a specific pixel 424 of the superimposed image may be mapped to a pixel 426 of the modified image 422. Similarly, pixels of side edges of the superimposed image 410 are also mapped to corresponding pixels within the modified image 422. As a result, as illustrated in FIG. 4, the modified image 422 appears, and is rendered, as if the superimposed image 410 had originally been present on the folded object 402, when the folded object 402 was folded in a manner corresponding to the folded object image 404.

Figure 5:
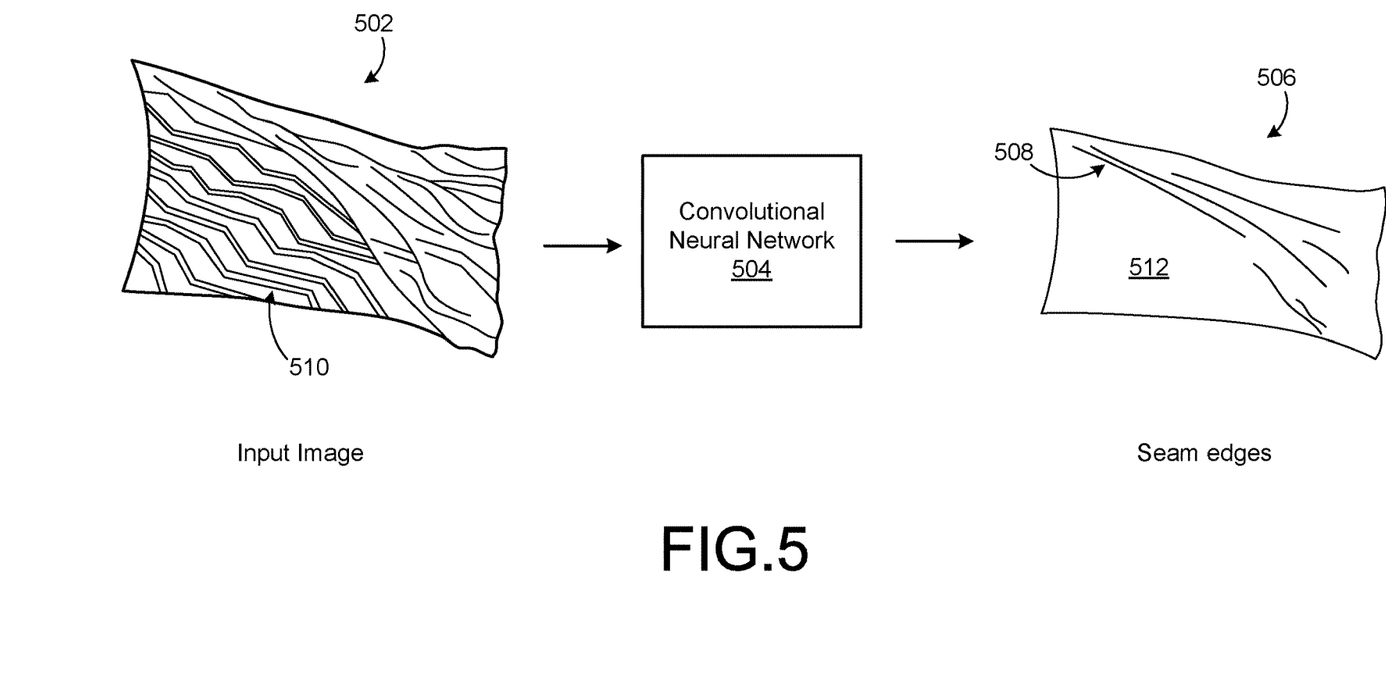
FIG. 5 illustrates a seam detection operation using the system of FIG. 1.

FIG. 5 illustrates an example in which a folded object image 502 is analyzed by a trained convolutional neural network (CNN) 504 to produce an image 506 that includes detected seam edges, including a seam edge 508. In more detail, as shown, the folded object image 502 may be an image of a cloth, such as a flag, that includes a number of folds, such as may occur when the flag is imaged while being blown by the wind. As illustrated, the flag may include a number of stripes or other textures, represented by, e.g., a stripe 510. Nonetheless, the CNN 504, such as may be implemented by the seam edge detector 124 of FIG. 1, may be trained and configured to identify the seam edges within the image 506, as shown, including the seam edge 508.

In this way, the portions of the image 506 that are defined by the detected seam edges may be separated into continuous, unfolded image regions, as illustrated by an example image region 512. As illustrated and described above, e.g., with respect to FIG. 4, each such divided image region may be subjected to appropriate image decomposition processes to obtain corresponding texture maps, which may then be combined to obtain a combined texture map for the folded object image 502 as a whole.

Figure 6:
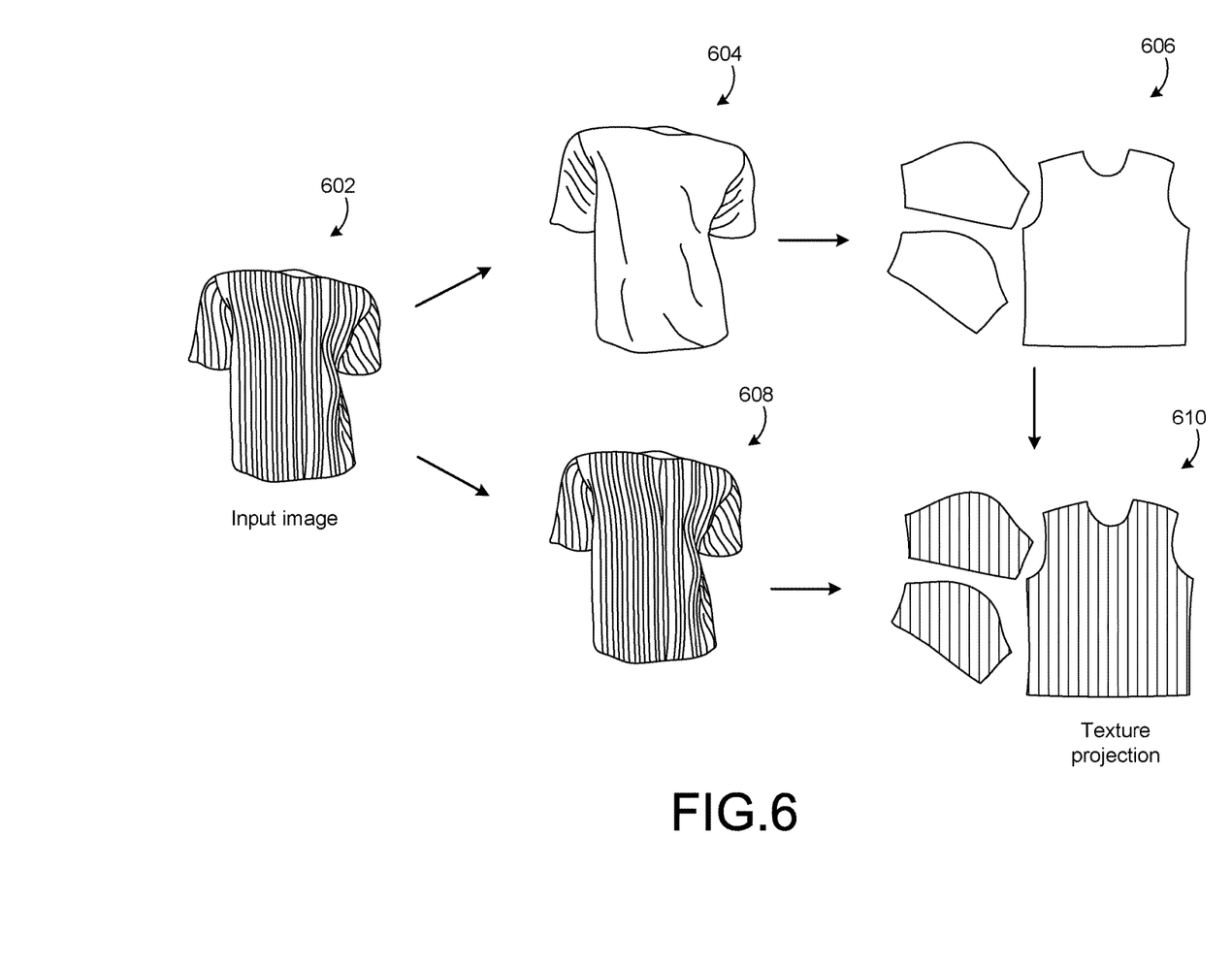
FIG. 6 illustrates an image decomposition example using the system of FIG. 1.

FIG. 6 illustrates example image decomposition processes that may be used in conjunction with the systems and methods of FIGS. 1-5. In the example of FIG. 6, an input image 602 is examined to generate an image 604 in which a 2D texture (e.g., striped design) of the input image 602 is removed. A normal map 606 of the input image 602 may thus be generated, e.g., using the normal map generator 130 of FIG. 1.

Further in FIG. 6, the input image 602 may separately be processed to obtain an albedo image 608, representing a version of the input image 602 with the lighting/shading that existed at a time of capture of the input image 602 being removed. For example, the texture map generator 132 may generate the albedo image 608, and proceed to generate a texture projection 610, using the normal map 606 and the albedo image 608.

As described, the texture projection 608 thus includes a pixel-for-pixel mapping to the pixels of the input image 602. As a result, edits performed in the texture space of the texture projection 610 may be directly mapped to corresponding edits within the input image 602, as illustrated and described above with respect to FIGS. 1-5.

As also illustrated and described above with respect to FIG. 5, it will be appreciated that the types of image decomposition illustrated and described with respect to FIG. 6, as well as other appropriate types of image decomposition, may be performed with respect to individual unfolded image regions of input images, such as the input image 602, that are defined with respect to seam edges detected by the seam edge detector 124 of FIGS. 1 and 5. For example, it will be appreciated that the normal map generator 130 and the texture map generator 132 may represent, or utilize, corresponding image decomposition algorithms that may be trained using the folded image generator 126.

In other words, in various example implementations, the types of image decomposition described generally with respect to FIG. 6 may represent, or be used in conjunction with, highly specialized types of image decomposition that are particularly suitable for processing specific, corresponding types of folded objects (e.g., cloth, paper, or garments). In particular, the parameter handler 136 of FIG. 1 may be configured to receive and define parameters corresponding to such specific types of folded objects, so that the folded image training dataset 138 is also specialized and configured with respect to such types of folded objects.

Figure 7:
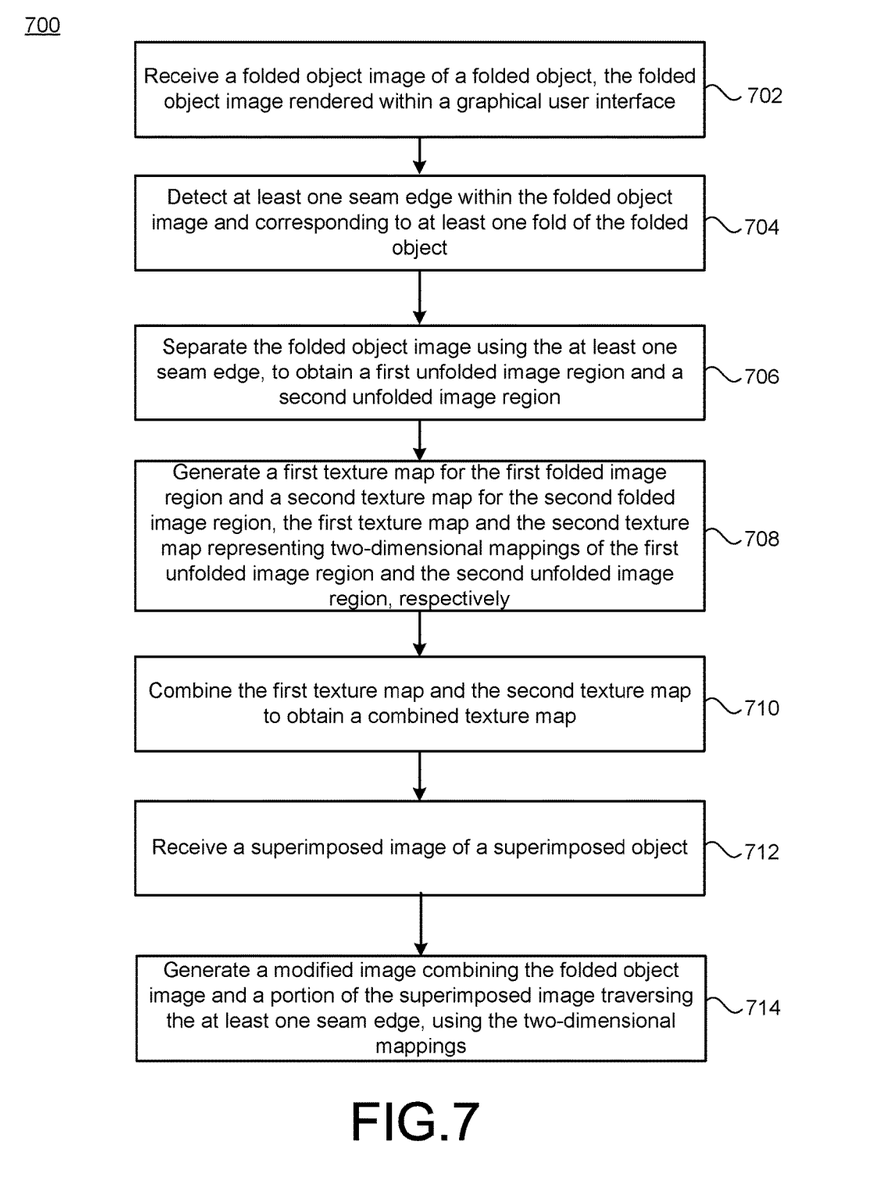
FIG. 7 is a flowchart illustrating detailed example operations of the system of FIG. 3.

FIG. 7 is a flowchart 700 illustrating more detailed example operations of the system 100 of FIG. 1, and in conjunction with the examples provided above with respect to FIGS. 4-6. In the example of FIG. 7, a folded object image of a folded object is received, the folded object image rendered within a graphical user interface (702). At least one seam edge within the folded object image and corresponding to at least one fold of the folded object may be detected (704). For example, the seam edge detector 124, using the convolutional neural network 504 of FIG. 5, may detect one or more seam edges, such as the seam edge 125 of FIG. 1, or the seam edge 508 of FIG. 5. Accordingly, as illustrated with respect to the seam edge 408 of FIG. 4, unfolded image regions, such as the unfolded image regions 412, 414, or the unfolded image region 512 of FIG. 5, may be defined.

A first texture map for the first unfolded image region and a second texture map for the second unfolded image region may be generated, the first texture map and the second texture map representing 2D mappings of the first unfolded image region and the second unfolded image region, respectively (708). For example, as illustrated with respect to FIG. 4, the texture map 416 may be generated for the unfolded image region 412, and the texture map 418 may be generated for the unfolded image region 414. Specifically, for example, for the texture map 416, the image decomposition processes of FIG. 6 may be performed with respect to the unfolded image region 412, and the image decomposition processes of FIG. 6 may similarly be used to process the unfolded image region 414 and obtain the texture map 418.

The first texture map and the second texture map may be combined to obtain a combined texture map (710). For example, the texture map generator 132 of FIG. 1 may combine the texture maps 416, 418 into the combined texture map 420. In some implementations, it may not be necessary to combine the various texture maps, such as when pixel mapping may be performed directly from each individual texture map 416, 418 to corresponding portions of the original folded object image 404.

A superimposed image of a superimposed object may be received (712). For example, the various superimposed images 120, 204, and 408 may be received or otherwise identified within a corresponding graphical user interface, such as may be used in conjunction with the display 114 of FIG. 1. For example, the superimposed image may be viewed within a graphical user interface as being overlaid upon, and movable over, the underlined folded object image.

As long as corresponding portions of the folded object image have been mapped using the texture mapping techniques described herein, the system 100 may be configured to generate corresponding modified images in real-time (or near real-time), e.g., showing modified images that correspond to various selected positionings of the superimposed image with respect to one or more seam edges. For example, in the simplified example of FIG. 1, the user may move the superimposed image 120 relative to the seam edge 125, thereby selecting different portions of the superimposed image 120 as being obscured within the modified image 122.

Thus, a resulting modified image may be generated, combining the folded object image and the portion of the superimposed image traversing the at least one seam edge, and using the 2D mappings of the first texture map and the second texture map (714). For example, the pixel mapper 134 may be configured to execute the above-referenced type of pixel mapping between the combined texture map and the original folded object image. For example, the superimposed image may be positioned relative to the two-dimensional mappings of the combined texture map. Then, the portion of the superimposed image that will be visible within the modified image may be determined, e.g., by mapping each pixel of the superimposed image positioned over a pixel of the combined texture map to corresponding, mapped pixels of the folded object image.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed by at least one computing device, are configured to cause the at least one computing device to:
   receive a folded object image including a folded object, the folded object image rendered within a graphical user interface and including at least one fold, the at least one fold obscuring a portion of the folded object and defining at least one seam edge;
   receive a superimposed image;
   identify a portion of the superimposed image corresponding to the portion of the folded object; and
   generate a modified image in which the portion of the superimposed image is removed, and a remaining portion of the superimposed image is superimposed on the folded object image and traverses the at least one seam edge.

2. The computer program product of claim 1, wherein the instructions, when executed to receive the folded object image including the folded object, are further configured to cause the at least one computing device to:
   provide the folded object image to a convolutional neural network (CNN) trained to recognize seam edges corresponding to folds in folded objects, using a folded image training dataset that includes a plurality of folded object images and known seam edges; and
   detect the at least one seam edge, based on an output of the CNN.

3. The computer program product of claim 1, wherein the instructions, when executed to receive the folded object image including the folded object, are further configured to cause the at least one computing device to:
   divide the at least one folded object image into at least a first unfolded image region and a second unfolded image region, the first unfolded image region and the second unfolded image region defined by the at least one seam edge.

4. The computer program product of claim 3, wherein the instructions, when executed to receive the folded object image including the folded object, are further configured to cause the at least one computing device to:
   perform a first image decomposition of the first unfolded image region, to obtain a first texture map in which a first three-dimensional surface of the first unfolded image region is mapped to a first two-dimensional surface to provide a first pixel mapping; and
   perform a second image decomposition of the second unfolded image region, to obtain a second texture map in which a second three-dimensional surface of the second unfolded image region is mapped to a second two-dimensional surface to provide a second pixel mapping.

5. The computer program product of claim 4, wherein the instructions, when executed to receive the folded object image including the folded object, are further configured to cause the at least one computing device to:
   generate a first surface normal map of the first unfolded image region;
   generate the first texture map using the first surface normal map;
   generate a second surface normal map of the second unfolded image region; and generate the second texture map using the second surface normal map.

6. The computer program product of claim 4, wherein the instructions, when executed to generate the modified image, are further configured to cause the at least one computing device to:

map the remaining portion of the superimposed image, using the first pixel mapping and the second pixel mapping.

7. The computer program product of claim 4, wherein the instructions, when executed, are further configured to cause the at least one computing device to:

combine the first texture map and the second texture map to obtain a combined texture map; and map the remaining portion of the superimposed image, using the combined texture map.

8. The computer program product of claim 1, wherein the instructions, when executed to receive the superimposed image, are further configured to cause the at least one computing device to:

receive the superimposed image at a position within the graphical user interface over the at least one seam edge.

9. The computer program product of claim 8, wherein the instructions, when executed to identify the portion of the superimposed image, are further configured to cause the at least one computing device to:

identify the portion of the superimposed image based on the position of the superimposed image relative to the at least one seam edge within the graphical user interface.

10. A computer-implemented method, the method comprising:

receiving a folded object image including a folded object, the folded object image rendered within a graphical user interface and including at least one fold, the at least one fold obscuring a portion of the folded object and defining at least one seam edge;

performing image decomposition on a first unfolded image region of the folded object image and a second unfolded image region of the folded object image, the first unfolded image region and the second unfolded image region being defined with respect to the at least one seam edge;

receiving a superimposed image; and generating, based on the image decomposition, a modified image in which a portion of the superimposed image that corresponds to the portion of the folded object is removed, and a remaining portion of the superimposed image is superimposed on the folded object image and traverses the at least one seam edge.

11. The method of claim 10, wherein the receiving the folded object image comprises:

providing the folded object image to a convolutional neural network (CNN) trained to recognize seam edges corresponding to folds in folded objects, using a folded image training dataset that includes a plurality of folded object images and known seam edges; and detecting the at least one seam edge, based on an output of the CNN.

12. The method of claim 10, wherein the performing image decomposition comprises:

generating a first surface normal map of the first unfolded image region;

generating a first texture map using the first surface normal map, the first texture map providing a mapping of a first three-dimensional surface of the first unfolded image region to a first two-dimensional surface to provide a first pixel mapping generate a second surface normal map of the second unfolded image region; and generate a second texture map using the second surface normal map, the second texture map providing a second three-dimensional surface of the second unfolded image region to a second two-dimensional surface to provide a second pixel mapping.

13. The method of claim 12, wherein the generating the modified image comprises:

performing the mapping of the remaining portion of the superimposed image, using the first pixel mapping and the second pixel mapping.

14. The method of claim 10 wherein the receiving the superimposed image comprises:

receiving the superimposed image at a position within the graphical user interface over the at least one seam edge.

15. The method of claim 14, further comprising:

identifying the o portion of the superimposed image based on the position of the superimposed image relative to the at least one seam edge within the graphical user interface.

16. A computer program product, the computer program product being tangibly embodied on a non-transitory computer-readable storage medium and comprising instructions that, when executed by at least one computing device, are configured to cause the at least one computing device to:

receive a folded object image including a folded object, the folded object image rendered within a graphical user interface;

detect at least one seam edge within the folded object image and corresponding to at least one fold of the folded object;

separate the folded object image using the at least one seam edge, to obtain a first unfolded image region and a second unfolded image region;

generate a first texture map for the first unfolded image region and a second texture map for the second unfolded image region, the first texture map and the second texture map representing two-dimensional mappings of the first unfolded image region and the second unfolded image region, respectively;

receive a superimposed image of a superimposed object; and generate a modified image combining the folded object image and a portion of the superimposed image traversing the at least one seam edge, using the two-dimensional mappings.

17. The computer program product of claim 16, wherein the first texture map and the second texture map are combined to obtain a combined texture map, and the modified image is obtained using the combined texture map.

18. The computer program product of claim 16, wherein the two-dimensional mappings provide a pixel-to-pixel mapping from pixels of the first texture map and the second texture map to pixels of the folded object image.

19. The computer program product of claim 16, wherein the instructions, when executed to generate the modified image, are further configured to cause the at least one computing device to:

position the superimposed image relative to the two-dimensional mappings; and determine the portion of the superimposed image including mapping a pixel of the superimposed image positioned over a pixel of the first texture map to a corresponding, mapped pixel of the folded object image.

20. The computer program product of claim 16, wherein the instructions, when executed to receive the superimposed image, are further configured to cause the at least one computing device to:

receive the superimposed image at a position within the graphical user interface over the at least one seam edge.

* * * * *